Figure 2:
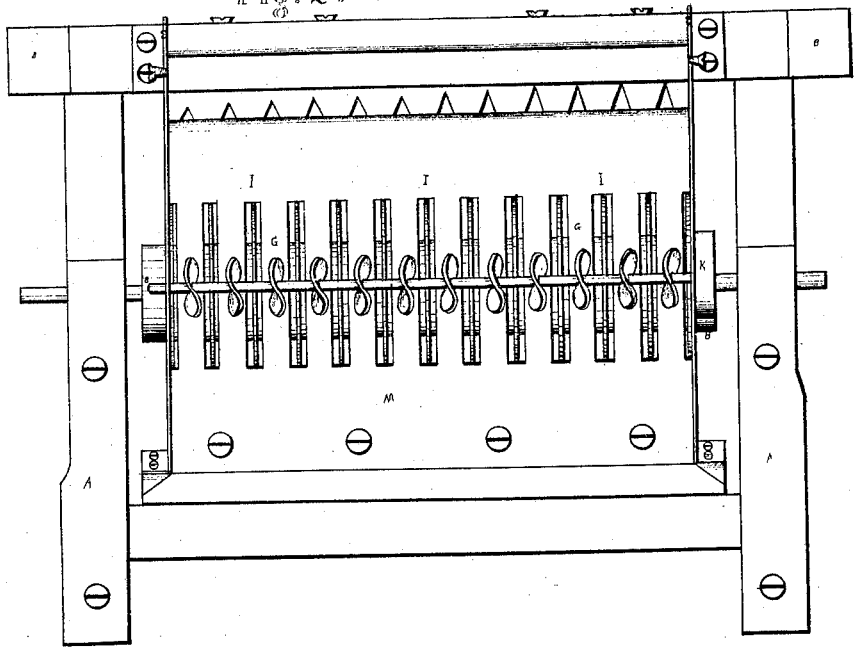
Figure 1:
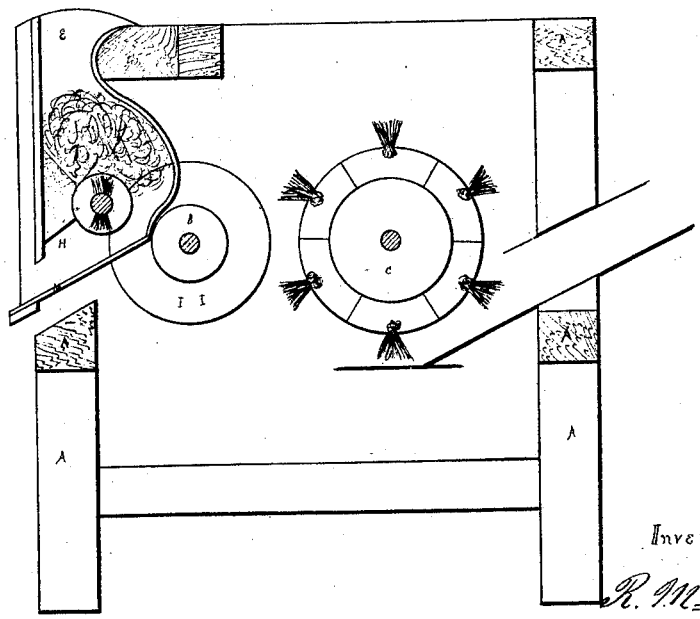

R. McKenna,
Cotton Gin.
No. 108,500. Patented Oct. 18, 1870.

Witnesses.

Inventor
R. McKenna
pr. Otto Leipzig

United States Patent Office.

ROBERT McKENNA, OF WHITE'S STATION, TENNESSEE.

Letters Patent No. 108,500, dated October 18, 1870.

IMPROVEMENT IN COTTON-GINS.

The Schedule referred to in these Letters Patent and making part of the same.

I, ROBERT MCKENNA, of White's Station, in the county of Shelby, State of Tennessee, have invented an Improvement in Cotton-Gins, of which the following is a specification.

The nature of my invention consists in the employment of a roller or shaft. It is located horizontally and longitudinally in the roll-box, at the bottom of the roll, near the lower edge of the seed-board. Said roller is provided with a series of flanges throughout its length, at equal distance from each other, which distance corresponds to the spaces between the saws on the saw-cylinder. Said roller revolves on its axis, and the flanges on said roller, in their revolutions, mesh into the parts of the roll that pass between the saws, thereby expelling the seed from the roll and pressing the lint against the saws. The flanges, as they revolve, expel the seed from the roll-box, conveying the seed in their exit in contact with the saws, enabling the saws to detain and return to the roll any seed that has not been entirely freed from lint.

The object of my invention being—

First, to keep the roll free from surplus seed.

Second, to keep the lint in contact with the saws.

Third, to prevent the seed from accumulating in the roll-box.

Fourth, to prevent the escape of seed not properly freed from lint.

Fifth, to increase the capacity of the gin as to quantity.

Description of the Accompanying Drawing.

Figure I is a longitudinal vertical section of a cotton-gin, embodying my invention.

Figure II is a front elevation of the same, with the seed-board removed.

Figure III is a plan of roller $f$ and flanges $g\ g$, enlarged.

Figure IV is a transverse section of roller $f$ and flanges $g\ g$, enlarged.

General Description.

$a$ is the frame of a cotton-gin.

$b$ is the saw-cylinder.

$c$ is the brush-cylinder.

$d$ is the roll.

$e$ is the end side board of the roll-box $i$.

All constructed, located, and operated in the usual manner.

$f$ is the roller or shaft, which constitutes the main part of my invention. It is of equal length with the roll $d$, and of any desired diameter. It is provided with a series of flanges, $g\ g$, throughout its length, at equal distance from each other, which distance corresponds to the spaces between the saws $I\ I$, on cylinder $b$.

Roller $f$ is located horizontally and longitudinally in the roll-box $i$, at the bottom of the roll $d$, near the lower edge of the seed-board $h$.

Roller $f$ is provided with journals, which are supported in bearings, which are fastened to the end side board $e$, or may be fastened to the grateful $m$ or seed-board $h$.

Roller $f$ is provided with a pulley, $k$, and rotation is communicated to it by a belt, $l$, from cylinder $b$.

The flanges $g\ g$, in their revolutions, mesh into the parts of the roll $d$ that pass between the saws $I\ I$, thereby expelling the surplus seed from the roll $d$ and pressing the lint against the saws $I\ I$.

The flanges $g\ g$, as they revolve, expel the seed from the roll-box $i$, conveying the seed in their exit in contact with the saws $I\ I$, enabling the saws $I\ I$ to detain and return to the roll $d$ any seed that has not been properly freed from lint.

Claim.

I claim as my improvement, and desire to secure by Letters Patent—

The roller or shaft $f$ and flanges $g\ g$, when combined and arranged as specified.

ROBERT McKENNA.

Witnesses:
CHAS. C. McCUBBIN,
A. R. WIGGS.